United States Patent [19]

Cantwell, Jr. et al.

[11] 3,727,218
[45] Apr. 10, 1973

[54] DIGITAL RADAR DETECTOR SYSTEM

[75] Inventors: Thomas C. Cantwell, Jr., Fullerton; Richard D. Wilmot, Yorba Linda, both of Calif.

[73] Assignee: Hughes Aircraft Company, Culver City, Calif.

[22] Filed: Jan. 29, 1971

[21] Appl. No.: 111,063

[52] U.S. Cl. ............................................. 343/5 DP
[51] Int. Cl. .................................................. G01s 9/02
[58] Field of Search ........................... 343/5 R, 5 DP

[56]  References Cited

UNITED STATES PATENTS 3,517,172   6/1970   Dillard ............................ 343/5 DP X Primary Examiner—T. H. Tubbesing
Attorney—W. H. MacAllister, Jr. and Walter J. Adam

[57]  ABSTRACT

An automatic digital target detector and azimuth measuring system that includes a digital filter whose amplitude weighting function corresponds to the antenna beam pattern so as to provide a desirable target detection probability and azimuth measurement accuracy. The target detector utilizes a digital matched time delay filter concept for target detection and azimuth beam splitting with only two sweeps of series connected delay or data storage being required. The binary weighted data is processed with a feedback path provided from the detector output to the input of each delay means, and with each feedback path including a variable multiplying factor which may be set or controlled to match the detector to different antenna beam shapes and beam widths, or may be set or controlled to operate with different or variable scan rates or with different radar pulse repetition frequencies. The detector is adaptable to different beam widths, to different scan rates and to different pulse repetition frequencies by controlling the period of impulse response.

12 Claims, 11 Drawing Figures

DIGITAL RADAR DETECTOR SYSTEM

BACKGROUND OF THE INVENTION

1. Field of the Invention

This invention relates to radar target detection systems and particularly to an improved digital matched filter target detector that requires a minimum of equipment and storage capacity and provides a high degree of detection sensitivity over a wide range of operating conditions.

2. Description of the Prior Art

A conventional target detector which may be of the binary moving window type utilizes a digital memory that is synchronized to the radar's master trigger to provide a detector for each range resolution cell or bin. A member must be provided with storage capacity for each range cell and for all the sweeps over the radar antenna beamwidth. Because target data must be stored for the entire beamwidth, operation with different antenna beams or radar systems or with different periods of response requires that the memory be extensively changed in size or capacity. Also conventional detectors do not provide the detection sensitivity that may be desired for some types of radar detection operation, especially at longer ranges. Further, in the beam splitting method utilized with conventional moving window detectors, the azimuth leading edge count is first detected and then stored in a memery and upon detection of the azimuth count of the trailing edge, the leading edge and trailing edge information are passed to a computer where the difference is divided by two and summed with a predetermined bias factor, to provide the position of the beam center. It would be a substantial advantage to the art if a digital detector were provided which was matched to the antenna beam shape so as to provide a high detection sensitivity, could be easily adjusted to match different beam conditions, required a minimum of memory capacity, and had detection characteristics that allowed a simplified and highly accurate azimuth determination.

SUMMARY OF THE INVENTION

Briefly, the digital target detector in accordance with the principles of the invention includes a digital time domain filter matched to the antenna beam shape and implemented in an arrangement so that the detector characteristics may be readily changed either initially or continually. The detector utilizes two summing devices, two multipliers and two multibit storage registers with the multipliers having selected or varying constants. In operation, the output of the detector is multiplied by a constant $\alpha_2$ having a value less than 1, and subtracted in the first summing device from new quantized video at the detector input. The results of this subtraction are stored in the first register for a radar sweep time and are added to the detector output after it has been multiplied by a constant $\alpha_1$ which has a value greater than 1. After passing through the second summing device the results are stored in the second register for one radar sweep time before passing to the detector output. The detector output provided by the second register (when the input signal is an impulse) is a signal having the characteristics of a decaying sinusoid, which is a good approximation to the parabolic forms of the antenna. Therefore the detector is a good approximation to a matched filter because a perfect matched filter would have an impulse response identical to the antenna beam pattern. Thus, the detector in accordance with the invention provides an output signal for each range bin equal to the input signal delayed by two radar sweep periods plus the corresponding output signal of the previous sweep period multiplied by a factor $\alpha_1$ minus the corresponding output signal of the second previous sweep multiplied by the different factor $\alpha_2$. The response characteristics of the detector provides a high sensitivity for target detection and a resultant reliable determination of target azimuth position.

It is therefore an object of this invention to provide a target detector of improved sensitivity and detection capability.

It is a further object of this invention to provide an improved target detector that operates with a minimum of equipment and storage capacity.

It is another object of this invention to provide a target detector that is readily adaptable to operations with different types of beam conditions and radar operation conditions.

It is a still further object of this invention to provide an improved radar target detector that allows reliable and accurate determination of the beam or azimuth target position.

BRIEF DESCRIPTION OF THE DRAWINGS

These and other objects, features and advantages of the invention itself, will become apparent to those skilled in the art in the light of the following detailed description taking in consideration with accompanying drawings wherein like reference numerals indicate like or corresponding parts throughout the several parts wherein:

FIG. 6 is a schematic timing diagram of amplitude versus time for further explaining the operation of the detector of FIG. 1 in accordance with the invention;

DESCRIPTION OF THE PREFERRED EMBODIMENT

Figure 1:
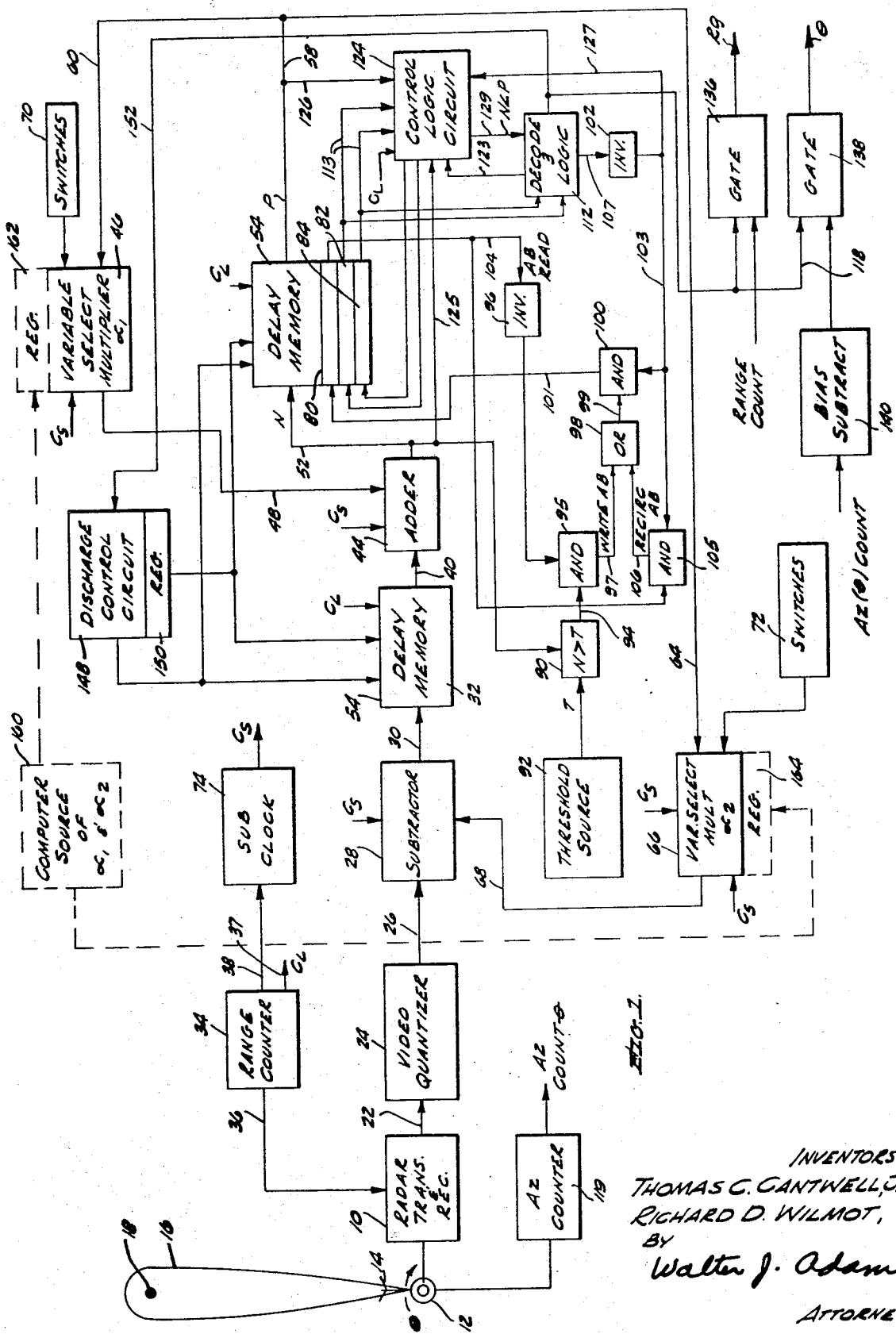
FIG. 1 is a schematic block diagram of an automatic radar target detection system including the target detector in accordance with the principles of the invention.

Referring first to FIG. 1 which shows the detector system in accordance with the invention in a typical pulse radar system having a radar transmitter and receiver 10 coupled to an antenna structure 12 having an antenna 14 rotating through the angle $\theta$. A beam 16 is developed by the antenna 14 and illuminates the target 18 as the beam of energy is sweep thereby. It is to be noted that the invention is not limited to operation of any particular type of radar or antenna and may include coherent or noncoherent pulse type radars and may include mechanically rotated antennas, parabolic dishes, or electronic or phase scan arrays. Also, the antenna structure 12 may provide a scan either through 360° or through a sector thereof or may provide a scan in the vertical or elevation dimension, the invention not being limited to any particular type of beam shape or scan pattern. Further, the invention is not to be limited to a constant scan rate or to a constant pulse repetition frequency. Energy received by the transmitter and receiver 10 in response to a pulse of energy transmitted and reflected from the target 18 is mixed and amplitude detected to provide a video signal which is applied through a suitable lead 22 to a video quantizer 24 which may provide binary amplitude data such as a 5-bit number on the leads of a composite lead 26. The quantized video on the lead 26 is then applied to the detector which includes a subtractor 28 in turn coupled through a composite lead 30 to a delay memory 32 which may include suitable memory for storing data from one radar sweep period or 10-bits for each 1,000 clock periods representing a thousand range bins for example. The additional 5 bits utilized in the detector may be required because of the effective gain of the filter with the feedback loops. Thus, the delay memory 32 may include ten shift registers with each shift register including a thousand flip-flops so that in response to each range count the data is shifted in all ten shift registers one range bin position. As is well-known, a radar sweep is defined as the period of energy return from a single pulse of transmitted energy, which period is divided into a plurality of range intervals or periods.

A range counter 34 provides a range count clock signal $C_L$ which is applied through a lead 36 to the radar transmitter and receiver 10 and through a lead 37 to the delay memory 32 and to a delay memory 54. In response to each range count signal the data is shifted out of the delay memory 32 through a composite lead 40 to an adder 44 which also receives data from a variable select multiplier 46 through a composite lead 48. A sum signal is applied through a composite lead 52 through the delay memory 54 which is similar to the memory 32 and may include 10 shift registers each of 1,000 bits in binary length and being responsive to the range count clock pulse $C_L$ on the lead 37. The delay memory 54 applies the data signal after one sweep time delay to a lead 58 and through a lead 60 to the $\alpha_1$ multiplier 46 with $\alpha_1$ having a value greater than 1. Also the signal on the lead 58 is supplied through a composite lead 64 to a variable select multiplier 66 which provides a multiplication of $\alpha_2$ having a value less than 1 and applies the product through a composite lead 68 to the subtractor 28. The variable select multiplier 46 may respond to a selected value $\alpha_1$ provided by a switch bank 70 and the variable select multiplier 66 may respond to selected value of $\alpha_2$ provided by a switch bank 72. Both the multipliers 46 and 66 may have their timing controlled by subclock signal $C_s$ provided by a subclock generator 74 responsive to the range count on a lead 38 and for example, dividing the range count period into eight subclock periods $C_s$. The subtractor 28, the adder 44, the variable select multiplier 46 and the variable select multiplier 66 may each be any suitable arithemetic circuit such as a full adder or a hybrid adder as are well-known in the art.

In order to provide a logical determination of the peak of the return signal on the target azimuth position, three additional 1,000-bit shift registers 80, 82 and 84 are provided in the delay memory 54 with the register 80 storing the active bit which is positive when a selective threshold has been exceeded and with the registers 82 and 84 storing a binary count required to determine the existence of a true peak signal at the output of the detector. It is to be noted that the delay memory 32 and the delay memory 54 may be J-K type flip-flops, for example, that require inputs at each clock time. A comparator circuit 90 responsive to a selective threshold source 92 compares the present detector signal N with the threshold value T to provide an output signal on a lead 94 when N is greater than T. An AND gate 95 responds to the signal on the lead 94 and the active bit derived from the register 80 on a lead 104 and applied through an inverter 96, to apply a write active bit signal through a lead 97 to an OR gate 98 which in turn applies the AB true signal through a lead 99, and AND gate 100 and a lead 101 which is applied to the input flip-flop of the register 80. An inverter 102 receives a decode 3 signal on a lead 107 from a decode 3-logic circuit 112 and applies an inverted form of the signal through a lead 103 to the AND gate 100 to insure that an active bit is only written when a target peak has not been detected. The AB true signal is also derived from an AND gate 105 which receives the AB read signal and the inverted decode 3 signal on the lead 103 to apply a recirculate AB signal on a lead 106 to the OR gate 98. For erasing the active bit the lead 101 provides a false signal in response to the inverted decode 3 signal being applied to the AND gate 100, which indicates that a target peak has been detected as a result of the signal amplitude falling for three successive sweeps in a particular range bin. The decode 3-logic circuit 112 receives the binary count from the registers 82 and 84 on leads indicated as 113 and and N < P or on time signal on a lead 129, and detects a count of three (count of two 10 and N < P). The circuit 112 with suitable AND gates determines the condition of a count of 2 (10) in coincidence with an on time fall in signal amplitude N < P. A previous count of two and the present condition N < P represents three continuous decreases in amplitude which is selected in the illustrated system as the occurrence of a target peak. A control logic circuit 124 is responsive to the count signal $C_L$, to the decode 3 signals on lead 123 and 127, to the N signal on the lead 125 and to the P signal on the lead 126. The signal P on the lead 126 is the target data one sweep period previous to the data N. The flip-flops of the memories may be of the J-K type with proper inverter logic included therein to provide the reset or K input terminal signal in response to the set signal as provided by the indicated set or J input leads of FIG. 1. The indicated register output leads of FIG. 1 may be from the true Q output terminal. To prevent racing, each flip-flop may include a suitable delay or storage therein so that data may be read therefrom and written into another flip-flop in response to the same clock pulse.

A gate 136 responds to the peak detection signal on the lead 118 to apply a range count signal $R_\rho$ to a suitable utilization source such as a computer and a gate 138 responds to the peak detection signal on the lead 118 to apply an azimuth count signal $\theta$, as derived from an azimuth counter 119, properly biased by a subtract circuit 140, to a suitable utilization source such as a computer. The detected signal on the lead 58 may be applied to a display or to a computer as a real time signal.

In one mode of operation in accordance with the invention, the delay memories 32 and 54 may be reset upon detection of a peak condition by a discharge control circuit 148 including a register 150 and responding to a peak detection signal at a certain range bin on a lead 152 to force a preselected level such as a threshold value into the flip-flops storing the presently processed range bin data. In another mode of operation in accordance with the invention a computer source 160 shown dotted, may be coupled to the register 162 in turn coupled to the multiplier 46 and to the register 164 in turn coupled to the multiplier 66, to provide different multiplier values $\alpha_1$ and $\alpha_2$ thereat varying as a function of a predetermined program which may be related to a variable scan rate of the antenna 14 or a varying PRF rate of the radar transmitter and receiver 10. As a result, a constant matched filter condition may be provided even though the scan rate or PRF rate is not fixed but varies over any desired pattern.

Figure 2:
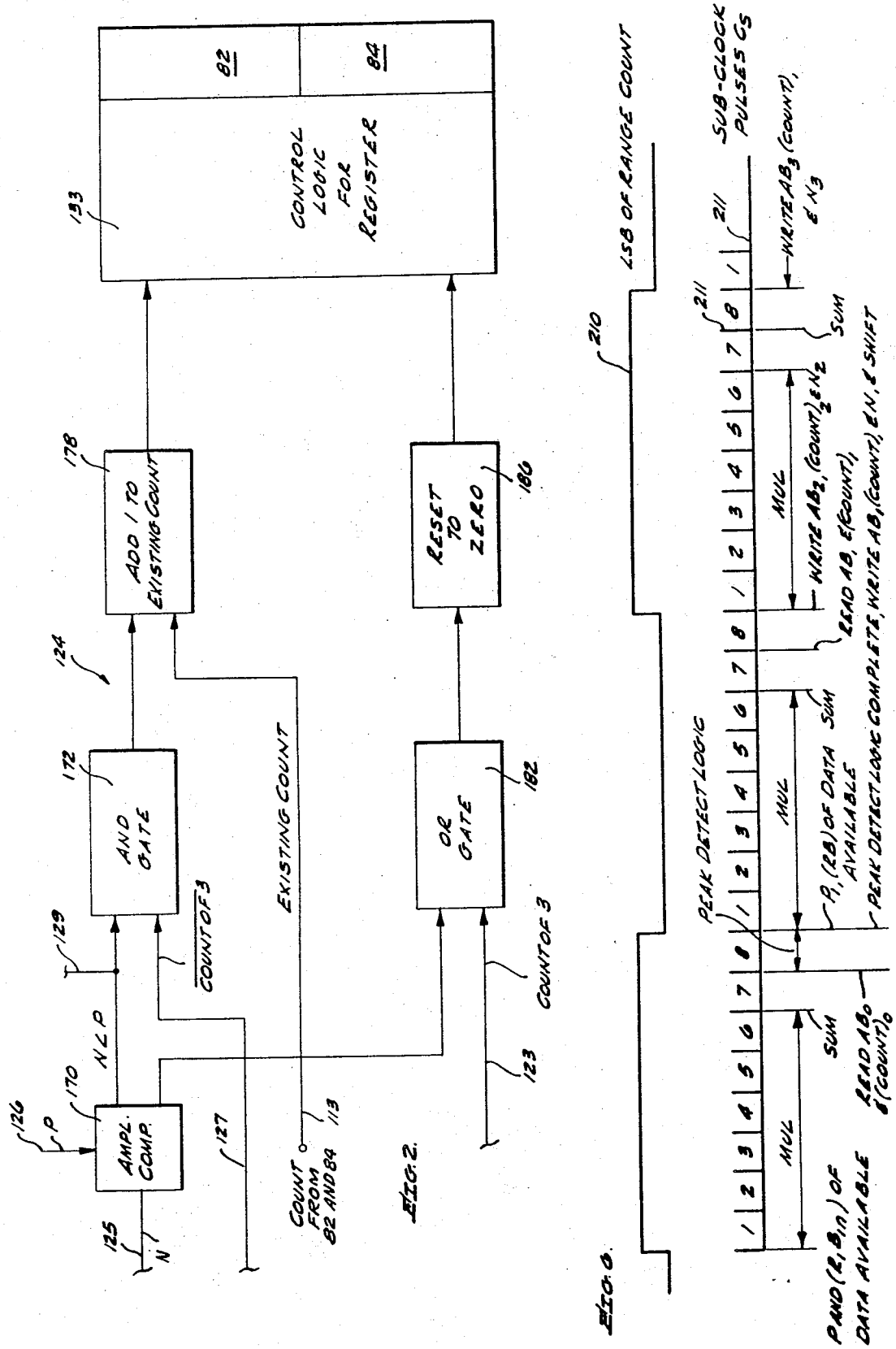
FIG. 2 is schematic block diagram of the control logic circuit of FIG. 1.

Referring now to FIG. 2 which shows the control logic circuit 124 of FIG. 1, the statistical detection of a target which requires three consecutive falls in amplitude during a particular range count over three successive radar sweeps, will be further explained. An amplitude comparator 170 being responsive to the amplitude of the P signal on a lead 126 and an N signal on a lead 125 applies a signal $\overline{N < P}$ to an AND gate 172, also receiving a $\overline{\text{count of 3}}$ signal on a lead 127 from logic circuit 112 (FIG. 1). In response to a coincidence in the AND gate 172, a signal is applied to a logic circuit 178 which adds one to the existing count received from a composite lead 113 for writing into the logic network 133 of the shift registers 82 and 84. For a reset condition when the active bit goes false (or the count of 3 is true) an OR gate 182 responds to the signal N > P from the comparator 170 or to the erase AB signal or count of 3 signal on the lead 123 to apply an energizing signal to a network 186 which provides a reset to zero signal to the control logic network 133. As the decode 3-logic circuit 112 of FIG. 1 senses the contents of the P data flip-flops of the shift registers 82 and 84 and the signal N < P, the arrangement of FIG. 2 controls the determination of three consecutive falls in amplitude of the detector signal, which peak detection on the lead 118 is representative of the azimuth of the target.

Figure 3:
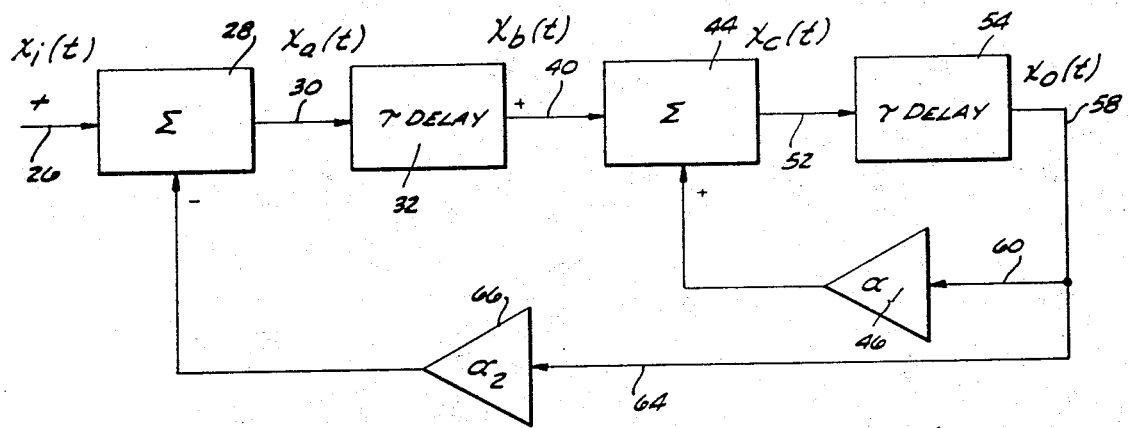
FIG. 3 is schematic block diagram for further explaining the operation of the matched filter detector of FIG. 1.

Referring now to FIG. 3 a signal flow graph for the digital detector is shown for further explaining the operation with $Xi(t)$ representing the signal on the lead 26, $Xa(t)$ representing the signal on the lead 30, $Xb(t)$ representing the signal on the lead 40, $Xc(t)$ representing the signal on the lead 52 and $Xo(t)$ representing the output signal on the lead 58. As this illustration represents a digital detector filter it may be described by the following difference equation:

$$X_0(t) = X_i(t-2\tau) - \alpha_2 X_0(t-2\tau) + \alpha_1 X_0(t-\tau) \qquad (1)$$

where $\alpha_1$ is the multiplier constant provided by the multiplier 46 having a value greater than 1 and $\alpha_2$ is a multiplier constant provided by the multiplier 66 having a value less than one and $t$ is time. This equation indicates that for any range interval, the output on the lead 58 is equal to the input from the second previous radar sweep period ($\tau$) minus the output from the second previous radar sweep period times the multiplier $\alpha_2$ plus the output from the previous sweep period times the multiplier $\alpha_1$. The impulse response of the digital filter in FIG. 3 may be expressed as:

$$X_0(t) = \frac{1}{\sqrt{\alpha_1^2 - 4\alpha_2}} \left[ \{1/2(\alpha_1 + \sqrt{\alpha_1^2 - 4\alpha_2})\}^{\frac{t}{\tau}-1} - \{1/2(\alpha_1 - \sqrt{\alpha_1^2 - 4\alpha_2})\}^{\frac{t}{\tau}-1} \right]$$

$$\sum_{n=0}^{\infty} \delta\left(\frac{t}{\tau} - n\right) + \frac{1}{\alpha_2} \delta\frac{t}{\tau} \qquad (2)$$

This equation is well defined for the condition $\alpha_1^2 > 4\alpha_2$.

For $\alpha_1^2 = 4\alpha_2$ the solution is obtained by a power series expansion and taking limits as $\alpha_1^2$ approaches $4\alpha_2$ the equation is for the critically damped solution:

$$X_0(t)\left(\frac{\alpha_1}{2}\right)^{\frac{t}{\tau}-2}\left(\frac{t}{\tau}-1\right) \sum_{n=0}^{\infty} \delta\left(\frac{t}{\tau}-n\right) + \frac{1}{\alpha_2}\delta\left(\frac{t}{\tau}\right) \qquad (3)$$

For the under-damped solution where $\alpha_1^2 < 4\alpha_2$ the following equation provides a solution $$X_0(t) = \left[\frac{2(\alpha_2)^{\frac{1}{2}(\frac{t}{\tau}-1)}}{\sqrt{4\alpha_2 - \alpha_1^2}} \sin\left\{\left(\frac{t}{\tau}-1\right)\cos^{-1}\left(\frac{\alpha_1}{2\sqrt{\alpha_2}}\right)\right\}\right]$$

$$\sum_{n=0}^{\infty} \delta\left(\frac{t}{\tau}-n\right) + \frac{1}{\alpha_2}\delta\left(\frac{t}{\tau}\right) \qquad (4)$$

To consider the stability requirements for the digital detector of the invention, the requirement for stability is that all poles of the Z transfer function lie within the unit circle in the Z domain. The two poles may be expressed by $Z_{1,2} = (\alpha_1/2) + \frac{1}{2}\sqrt{\alpha_1^2 - 4\alpha_2}$.

For $\alpha_1^2 > 4\alpha_2$ the poles are real and unequal and the stability requirement is $\alpha_1 - \alpha_2 < 1$.

For $\alpha_1^2 = 4\alpha_2$ the poles are real and the stability requirement is $\alpha_1 < 2$.

For $\alpha_1^2 < 4\alpha_2$ the poles are a complex conjugate pair and the stability requirement is $\alpha_2 < 1$. Thus the modes of operation for the oscillatory or underdamped condition is $\alpha_1^2 < 4\alpha_2$, for critically damped condition $\alpha_1^2 = 4\alpha_2$ and for the over-damped condition $\alpha_1^2 > 4\alpha_2$.

Figure 4:
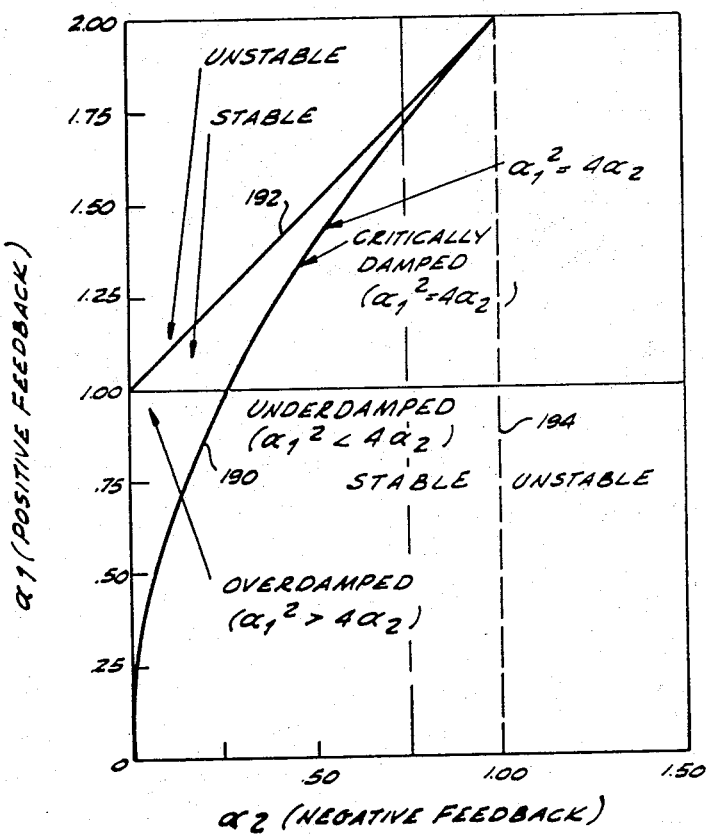
FIG. 4 is a graph comparing the multiplying factors $\alpha_1$ and $\alpha_2$ for showing the stable and unstable regions of operation of the detector of the invention.

Referring now principally to FIG. 4 showing a plot of $\alpha_1$ which is the positive feedback multiplier and $\alpha_2$ which is the negative feedback multiplier, a curve 190 represents a critical damping condition $\alpha_1^2 = 4\alpha_2$ with the area below the curve 190 representing the underdamped condition $\alpha_1^2 < \alpha_2$ and the area above the curve 190 representing the over-damped condition $\alpha_1^2 < 4\alpha_2$. For considering stability, the area below a curve 192 and to the left of a dashed line 194 is stable or represents stable operation and the area above the curve 192 represents an unstable condition. The area above the curve 192 may not even by an oscillatory condition and the area to the right of the dashed line 194 may be an oscillatory condition that is rapidly increasing in magnitude in an unstable manner. It is to be noted that the stability regions are set by the conditions that $\alpha_1 - \alpha_2 < 1$, $\alpha_1 < 2$, and $6\theta_2 < 1$.

Figure 5:
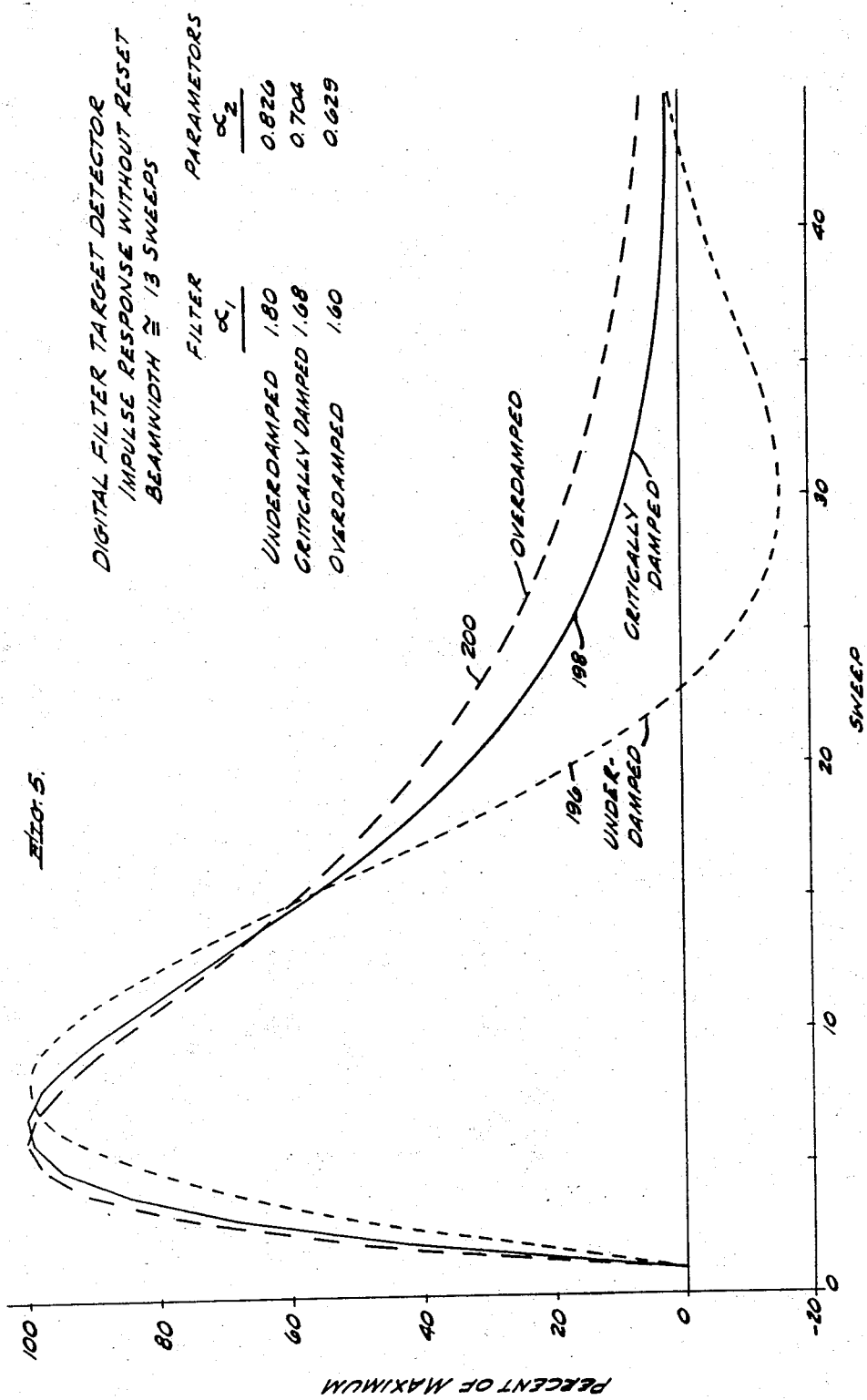
FIG. 5 is a graph of sweeps versus amplitude for showing the impulse resonse of the detector in accordance with the invention for selection of underdamped, critically damped and over-damped operating conditions.

Referring now to FIG. 5 which shows the impulse response of the digital filter target detector in accordance with the invention, curves 196, 198 and 200 respectively show the impulse response for an underdamped condition, a critically damped condition and an over-damped condition. The impulse response is a decaying sinusoid (reset at zero to prohibit negative values) which is a good approximation to the parabolic form of the antenna pattern. By selected different ones of the three damping conditions as a result of the relations between $\alpha_1$ and $\alpha_2$ different shaped impulse response and symmetry may be utilized for different antenna beam patterns. The curves 196, 198 and 200 were determined for a beamwidth of 13 sweeps and for the values of $\alpha_1$ and $\alpha_2$ as indicated on FIG. 5. The beamwidth of 13 sweeps is defined as the half power down or 3 decibels down points for the one-way response of the antenna.

Referring now also to FIG. 3, the curve such as 196 represents the signal as provided on the lead 58 over a plurality of sweep intervals as a result of the feedback operation for that range bin during each of the plurality of sweeps. On the composite lead 40 a negative form of the curve 196 is also provided delayed one radar sweep period and with a negative amplitude of $\alpha_2$ times the positive amplitude of the curve 196 which may be 0.826 times the positive amplitude. Thus the detector of the invention operates continuously to provide a substantially matched filter response (time domain filter response) to the input signal having a well-defined peak or target azimuth condition.

Referring now to FIG. 6, as well as to FIG. 1, the operation of the system will be explained in further detail. A least significant bit of the range count shown by a waveform 210 defines the range bins with data from each of the plurality of range bins being stored in the delay memories 32 and 54. The transmitter and receiver 10 in response to the range counter 34 transmits pulses of energy in a beam 16 to illuminate a target indicated by a point 18 as the antenna 14 scans past the target. As a result, energy is received by the antenna 14 from each range interval or bin within the range of the beam 16, and in a conventional manner video signals are derived during each range bin and applied to a video quantizer 24. A digital number representative of the received signal during each range bin interval is applied to the composite lead 26 from the quantizer 24. Upon occurrence of a first subclock pulse $C_a$ of a waveform 211 at the beginning of a first subclock period a (range bin)$_o$ of data and $P_o$ data stored in the last flip-flops of the shift registers of the delay memory 54 are available and during the subclock intervals one through six, multiplication of the $P_o$ data by $\alpha_1$ and $\alpha_2$ is performed. In response to the clock pulses at the beginning of the seventh subclock period subtraction is performed in the subtractor 28 and addition is performed in the adder 44 so that at the pulse at the beginning of the subclock interval 8, $N_1$ and $P_1$ data are available. Also at the beginning of subclock interval 8, $AB_o$ and (count)$_o$ data are read from the memory for providing the peak detection operation. In response to this subclock pulse at the beginning of interval 8, the peak detect logic is performed, and $AB_1$, (count)$_1$ and $N_1$ are written into the memory 54 in response to a $C_L$ pulse at the time of the subclock pulse at the beginning of subclock interval 1 of the next range bin. Also in response to this clock pulse at the beginning of period 1, the data is shifted in both delay memories 32 and 54 as well as being written into both memories and $P_1$ is available on lead 58. During this next range count interval, multiplication occurs in a similar fashion during subclock periods 1 though 6, summing is performed in response to the clock pulse at the beginning of the period 7 and $P_2$ is available at the end of the eighth subclock period. A similar operation occurs during each range count interval to continuously provide the output data P and a decode 3-logic signal on the lead 118 for passing the range count and azimuth count after a bias subtraction to a utilization device such as a computer. Thus, the active bit logic and the trailing edge logic are performed utilizing the N and P data from the same range bin. During the eighth subclock interval the comparison unit 90 compares the N data from the composite lead 52 to the threshold value supplied by the source 92 and writes an active bit true when one is not presently stored in the memory and when N is greater than P. The decode 3-logic circuit 112 provides a recirculate signal from the AND gate 105 when the active bit is true in the memory and a decode of three condition is not present, that is, there has not been three consistent decreases in amplitude of the return energy. The active bit is erased or a 0 is written in response to a decode of three signal being true from the logic unit 112. The active bit which indicates that a target is to be expected, is stored until a count of three falls in amplitude is determined, and may be utilized in various radar display monitors to supplement the display of raw rideo or may be utilized in some systems to control the valid target detection logic. It is to be noted that although J-K type flip-flops are utilzied in the register 80 in the illustrated arrangement, other types may be utilzied in accordance with the invention. Also other types of memories such as cores, other magnetic types, bubble memories or any suitable type is included within the scope of this invention.

Referring now also to FIG. 2 which provides a count signal for controlling logic circuit 122 AND gates 100 and 105 and provides signals for changing the count stored in the flip-flops of the registers 82 and 84 for each particular range bin. The count is incremented by one in response to N being less than P as determined by the comparator 170 and the count of three as derived from the lead 127. The count is reset to zero in response to the OR gate 182 receiving a signal indicating N is greater than P or a reset term for the active bit which is a decoded count of three signal.

In one arrangement in accordance with the invention switches 70 and 72 may be provided as a source of the multiplier constant $\alpha_1$ and $\alpha_2$. For providing variable values of $\alpha_1$ and $\alpha_2$ such as operating with variable scan rates or pulse repetition frequency rates for example, the computer source 160 may be utilized to provide the binary $\alpha_1$ and $\alpha_2$ values which may vary periodically or during each range bin as determined by the changes in the radar scanning or PRF. Another feature that may be included in the system in accordance with the invention is a discharge upon target detection in response to control circuit 148 and register 150 providing a predetermined value to the registers of the memories 32 and 54 containing the range bin data being presently recorded, upon the detection of a target such as by determination of a count of three. The value inserted into all the range bin positions of the memories 32 and 54 in which a target peak is detected may be, for example, a mean signal level or mean noise level either, predetermined or continuously determined by computation means (not shown).

Figure 7B:
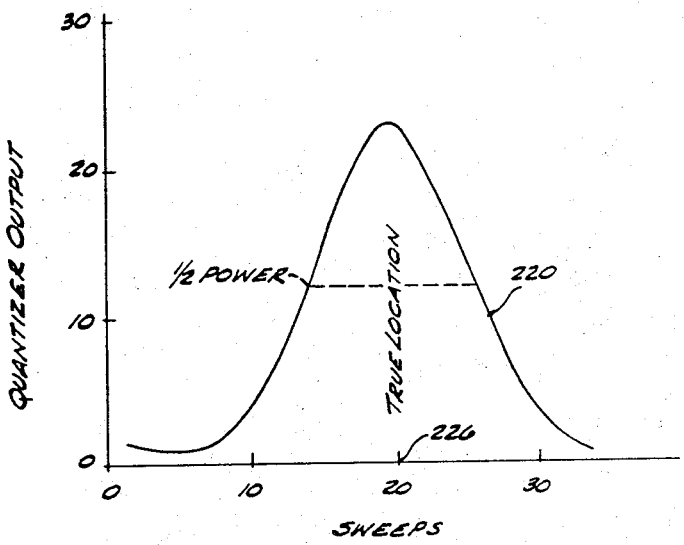
FIGS. 7a and 7b are diagrams of amplitude versus radar sweeps showing a real target input and detector output for further explaining the operation of the detector of FIG. 1.
Figure 7A:
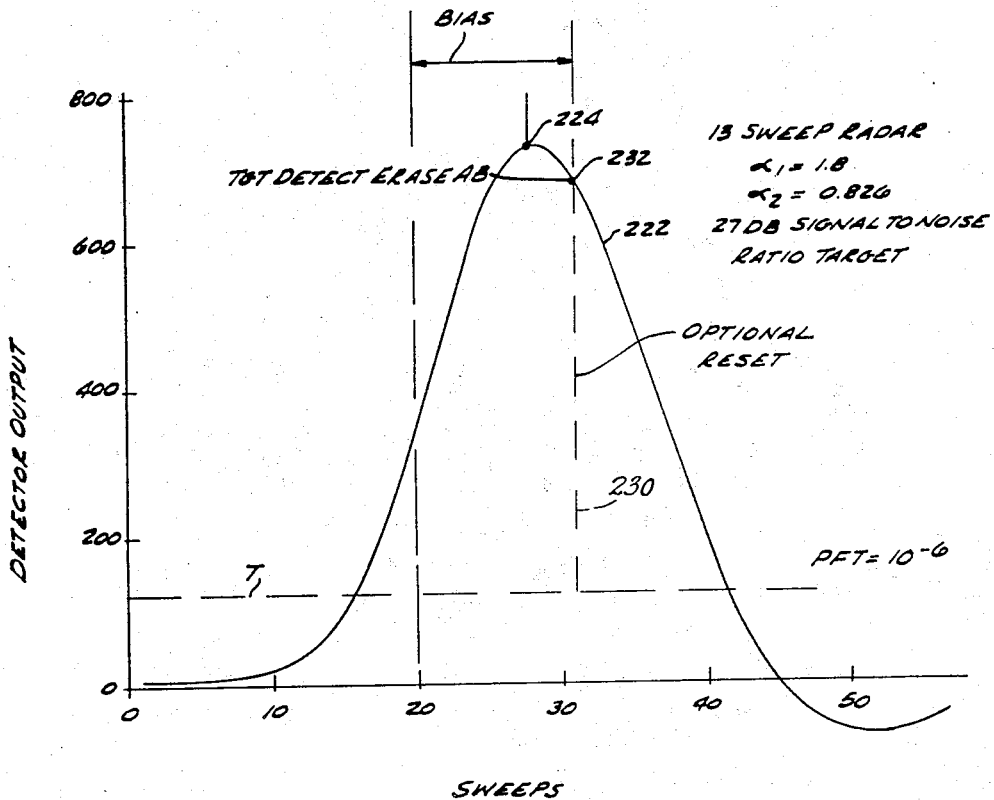

Referring now to FIGS. 7a and 7b as well as to FIG. 1 a signal 220 shows the real target input signal to the filter detector over a period of about approximately 34 sweeps while the antenna and beam 16 are scanning past the target such as 18. The beamwidth of the signal 220 at the half power down for one-way transmission is 13 sweeps. A detector output signal 222 as provided on a lead 58 in response to the target signal 220 is shown having a delay of eight sweep intervals as provided by the detector operation in accordance with the invention. The curves 220 and 222 were derived from a 13 sweep radar, a 27 db signal-to-noise ratio target and with $\alpha_1$ equal 1.8 and $\alpha_2$ equal 0.826. The PFT or probability of false target threshold was set at a value of $10^{-6}$ as shown by the line T. The bias from the point of detection of a target as indicated as 224 from the taget true location as indicated as 226 was found for this radar and system over all range bins to be approximately 8.3 radar sweep positions in azimuth. The bias illustrated for a particular range bin is necessarily an integer number of sweeps. Thus the bias subtract circuit 140 subtracts this value of 8.3 sweep intervals plus 3 sweep intervals (three successive falls in amplitude) from the azimuth count to pass this value through the gate 138 upon detection of target peak 224, which detection occurs three sweep intervals thereafter. When utilizing the discharge control circuit 148 a dotted line 230 shows the resetting of the registers for that range bin data in response to the peak detection at 232, thus allowing the system to detect another target without the delay required for decreasing the stored amplitude in the normal operating mode. It is to be noted that in the illustrated system, the active bit is reset at the point 232 upon detection of a target peak. It is to be understood that in other arrangements in accordance with the invention the active bit may be retained and reset, for example, upon the falling of the signal of waveform 222 to below the threshold level T.

Figure 8:
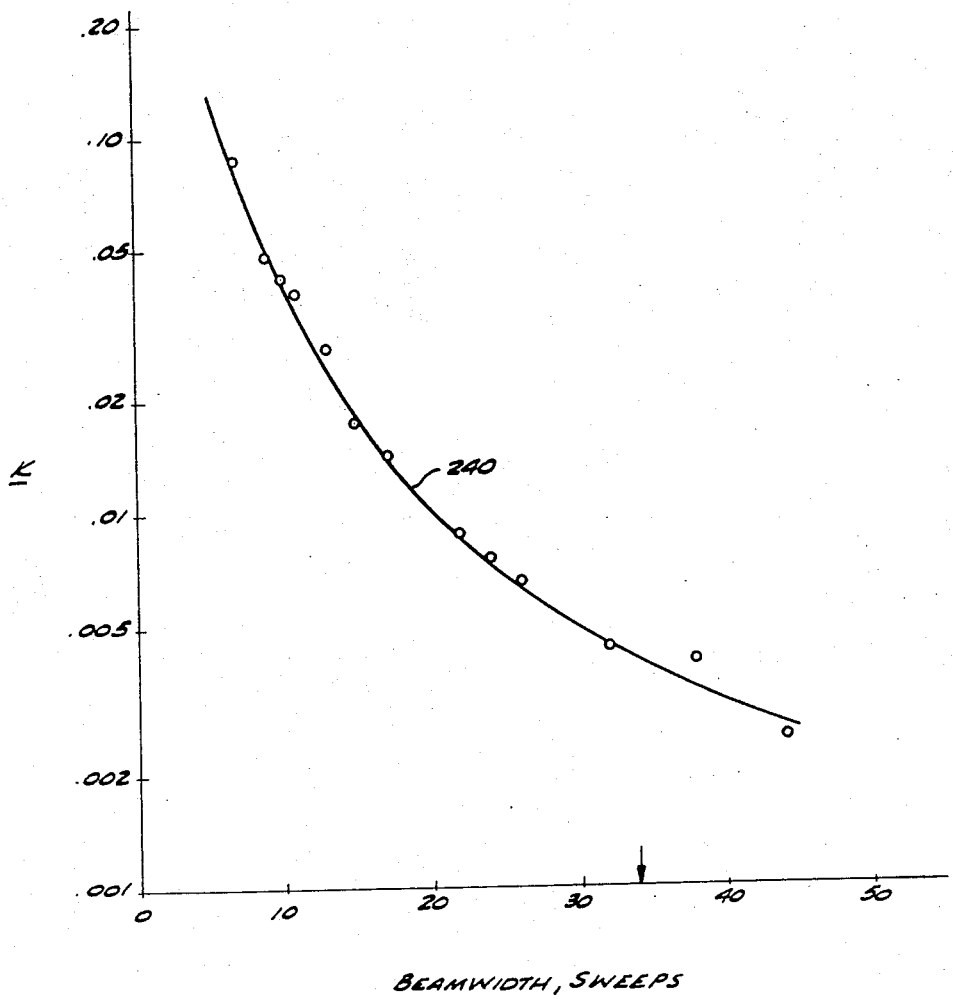
FIG. 8 is a graph of a parameter K versus radar sweep for explaining the relation between the beam width and the multiplying constants $\alpha_1$ and $\alpha_2$.

Referring now to FIG. 8, a curve 240 provides a parameter K which is a function of desired beamwidth the curve 240 being determined from a computer simulated analysis of the detector of FIG. 1. The curve of FIG. 8 and the resulting determination of $\alpha_1$ and $\alpha_2$ is determined from a simulation that is substantially valid for the over-damped, critically-damped, and under-damped detector. Utilizing the equation $\alpha_1 = \alpha_2 + 1 - K$, the value of $K$ for a selected beamwidth can be utilized to provide the reaction between $\alpha_1$ and $\alpha_2$ for a stable operable detector. One or both feedback parameters may be varied until an impulse response desired for that beamwidth is selected. All choices of the feedback parameter pairs $\alpha_1$ and $\alpha_2$ provided by the above equation for the given beamwidth, result in a constant difference between the parameters, with the constant being a function of beamwidth. The curve 240 permits one of the feedback parameters to be calculated once the other is selected, to provide operation at a selected beamwidth. The choice of the independent parameter $\alpha_1$ or $\alpha_2$ from which the other is to be calculated, can be based on other considerations, such as symmetry, stability, ease of implementation, type of damping, or amount of damping. It is to be noted that the invention is not limited to any particular method of detecting $\alpha_1$ and $\alpha_2$ but other procedures such as a trial and error procedure where one or both feedback parameters are varied until the impulse response has the desired number of intervals between half-value points, may be utilized.

Figure 9:
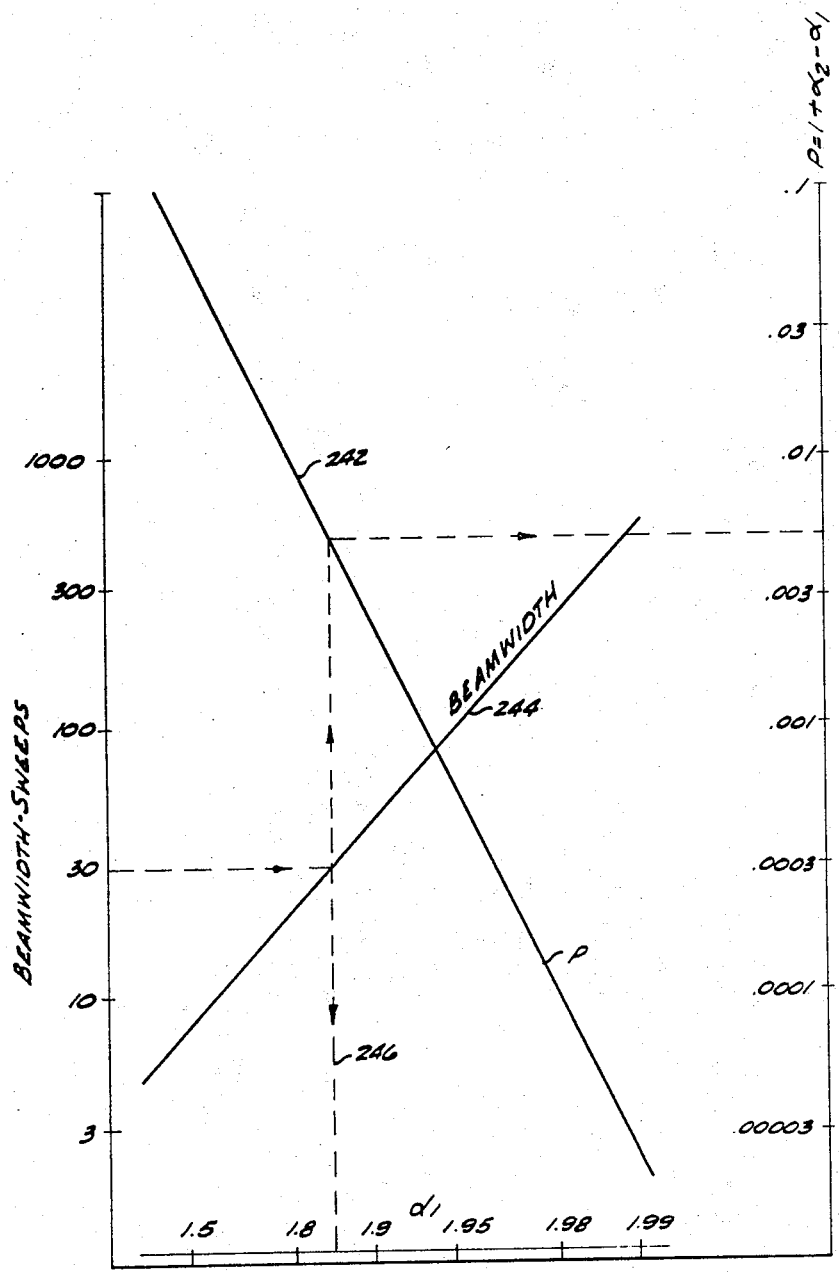
FIG. 9 is a graph for further explaining the relations between the multiplying constant $\alpha_1$ and $\alpha_2$ for different beam widths for a critically damped detector operation.

Referring now to FIG. 9 curves 242 and 244 are shown for determining the feedback parameters $\alpha_1$ and $\alpha_2$ for a critically damped detector. The graph of FIG. 9 was determined by a computer simulating a radar system operating with the detector of the invention. For selecting the parameters $\alpha_1$ and $\alpha_2$ the desired beamwidth (in sweeps) is found on the left vertical axis and a line drawn horizontally to intersect the curve 244 labeled "Beamwidth." A vertical projection of this intersection on the bottom axis gives the value of $\alpha_1$. A vertical projection of the intersection of the curve 242 labeled "P," followed by a horizontal projection to the right vertical axis enables the value of the parameter P to be determined. The values of $\alpha_2$ is then given as $\alpha_2 = \alpha_1 - 1 + P$. As an example, consider matching the detector to a radar having a beamwidth of 30 sweeps. The dotted line 246 in FIG. 9 shows that $\alpha_1$ should be 1.84 The parameter P is found to be 0.005, so that $\alpha_2 = \alpha_1 - 1 + P = 1.84 - 1 + 0.005 = 0.845$. Hence the correct values for this radar are $\alpha_1$ equal to 1.84 and $\alpha_2$ equal to 0.845. For detectors operating in the over-damped or the under-damped condition, similar relations may be provided experimentally or by computer simulation to select values of $\alpha_1$ and $\alpha_2$ or the curve of FIG. 8 may be utilized.

Figure 10:
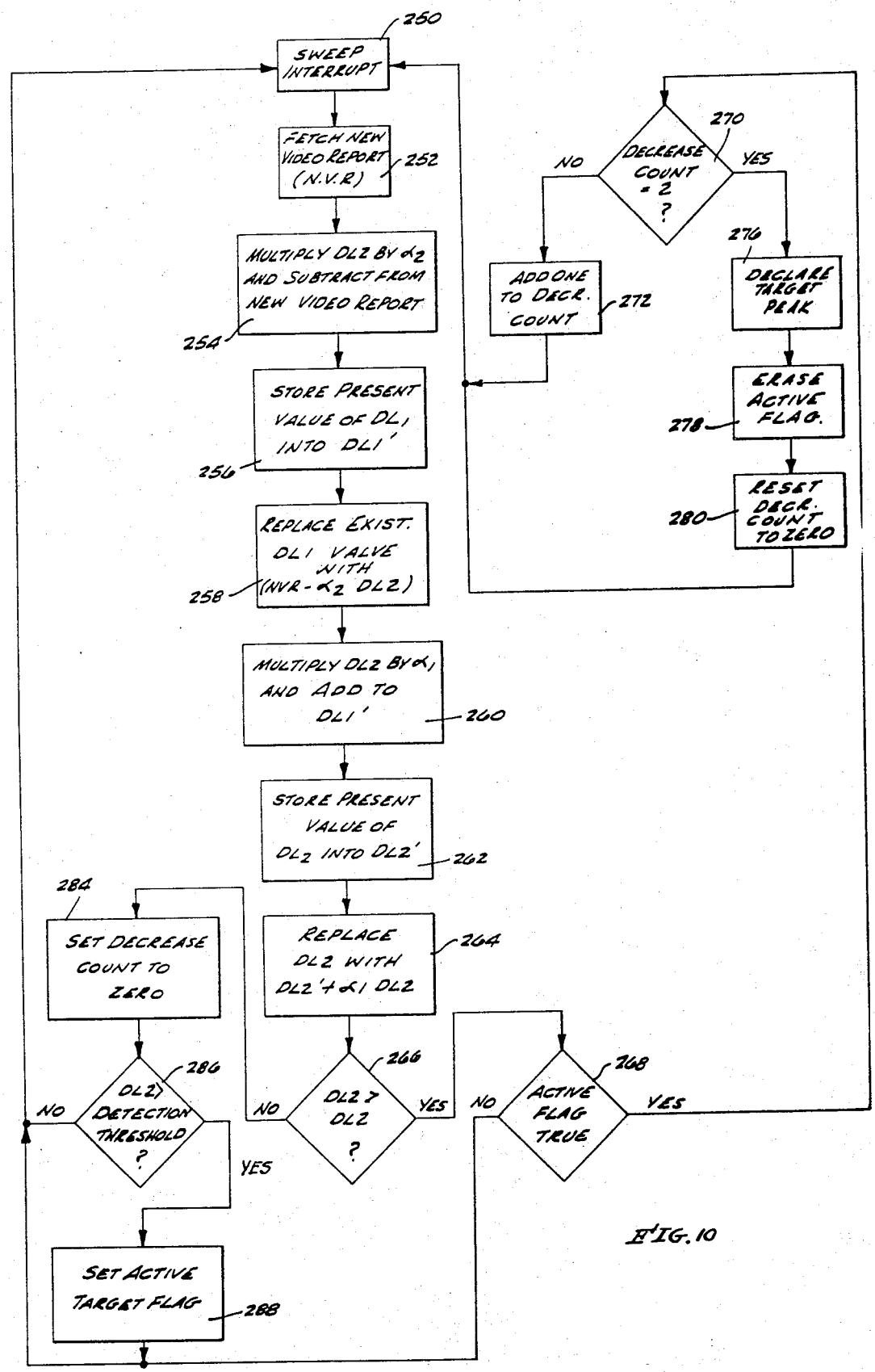
FIG. 10 is a flow graph for implementation of the detector in a general purpose computer with an input-output and processing rate fast enough to equal the radar output data rate.

Referring now to FIG. 10 a flow diagram is shown for providing the detector operation in accordance with the invention as a program in a digital computer such as the computer 160 of FIG. 1 utilized to provide substantially all of the detection operation. The flow diagram is shown to illustrate that the operation may be programmed in a digital computer either partly and completely within the scope of the invention. The computer and its memory would receive the quantized data from the quantizer 24 (FIG. 1) and in response to the range timing signals provide the detector output signals to the lead 58 and provide signals that would be used to control the gates 136 and 138. A block 250 represents the sweep interrupt operation and the operation passes into a fetch new video report (NVR) in a block 252. In a block 254, the delay line 2 contents DL2 stored in computer memory are multiplied by $\alpha_2$ and subtracted from the new video report, and in a block 256 the present value in DL1 (delay line 1) is stored in the memory cell DL1'. In a block 258, the existing DL1 value is replaced with NVR-$\alpha_2$ DL2. The DL2 value is multiplied by $\alpha_1$ and added to the contents of DL1' in the block 260, the present value of DL2 is stored in cell DL2' in a block 262 and DL2 is replaced with DL1' + $\alpha_1$ DL2 in a block 264. A slope determination is made in a block 266 to determine if DL2' is greater than DL2 and if it is, indicating a decrease in slope, the YES signal is applied to the active flag block 268. If the active flag is true, the operation then goes to the block 270 indicating that there is an active target. The block 270 determines whether the previously decreased count is equal to 2 and if it is not the operation proceeds to the block 272 which increments the decrease count and transfers the operation back to the sweep interrupt block 250. If the decrease count is equal to 2 in the block 270 the operation proceeds to block 276 which declares a target peak and proceeds to the block 278 which erases the active flag. The operation then proceeds to the block 280 which resets the decrease count to zero and transfers the operation back to the sweep interrupt block 250.

If upon determination of a downward slope, the operation in the block 268 determines that the active flag is not true, the operation returns to the sweep interrupt block 250. If in the block 266 the slope is determined to be upward, the operation proceeds to a block 284 which changes the decrease count to zero and transfers the operation to a block 286 which determines if the contents of DL2 is greater than the detector threshold. If DL2 is not greater than the detector threshold, the operation is transferred back to sweep interrupt block 250 and if the DL2 is greater than the detector threshold, the operation transfers to block 288 which sets the active target flag bit and in turn transfers the operation back to the sweep interrupt block 250. It is to be understood that the operation of the flow diagram of FIG. 10 may be programmed on any suitable type computer utilizing conventional programming techniques if the computer has sufficient speed to process real time radar outputs.

Thus there has been provided an automatic digital target detection system for scanning type radars, that provide a digital time domain filter whose amplitude weighting function corresponds to the antenna beam pattern to provide a relatively high signal-to-noise ratio output signal. The detector operating in response to multi-lead quantized input data provides a substantial improvement in target detection probability and azimuth measurement accuracy. The detector system with a minimum of adjustment may be utilized with radar systems of any beamwidth or PRF. Also the system includes features that allows it to match a varying beamwidth such as may occur with a scanning radar or a radar scanning at a varible rate. The detector principles are applicable to scanning in any dimension such as in the azimuth or elevation planes. Because of the detector's improved operational concept a minimum of binary digital storage and equipment is required for its operation.

What is claimed is:
1. A target detector comprising:
   a first and a second memory;
   a source of target data;
   an output terminal;
   a first summing circuit coupled between said source of target data and said first memory;
   a second summing circuit coupled between said first and second memory;
   a first feedback path coupled between said output terminal and said first summing circuit; and
   a second feedback path coupled between said output terminal and said second summing circuit.
2. A target detector responsive to reflected energy returned from a target over a plurality of range intervals for each of a plurality of range sweeps comprising:
   quantizing means responsive to said reflected energy during a range interval to provide target data in each range bin;
   first and second memory means for storing data representing each range interval of a range seeep;
   first summing means having first and second inputs and an output with the first input coupled to said quantizing means and the output coupled to said first memory means, for subtracting the data on said second input from the data on said first input;
   second summing means having first and second inputs and an output with the first input coupled to said first memory means and the output coupled to said second memory means for adding data from said first and second inputs;
   output means coupled to said second memory means;
   a first feedback path coupled between said output means and the second input terminal of said first summing means; and
   a second feedback path coupled between said output means and the second input terminal of said second summing means.
3. The combination of claim 2 in which said first and second feedback paths include multiplying means for multiplying the data at said output means by selected multiplying values.
4. The combination of claim 3 in which the multiplying means in said first and second feedback paths provide multiplying values respectively less than and greater than one.
5. The combination of claim 4 in which said output means includes target azimuth determining means for determining the occurrence of the peak of the return energy from the target.
6. The combination of claim 5 further including discharge control means coupled to said first and second memory means and to said output means for selectively discharging the memory to a predetermined value upon determining a target peak in any range interval.
7. The combination of claim 4 further including selectable means coupled to the multiplying means of said first and second feedback path for providing selected multiplying values thereto.
8. The combination of claim 7 in which said selectable means is manually controllable.
9. The combination of claim 4 further including a computing source of multiplying values coupled to the multiplying means in said first and second feedback paths for providing selected multiplying values thereto.
10. A target detector responsive to a scanning radar system transmitting pulses of energy and receiving return energy over a radar sweep, each sweep including a plurality of range bins, the radar system providing binary amplitude data for each range bin, said detector comprising:
- a subtractor having first and second input terminals and an output terminal with said first input terminal receiving said binary amplitude data during each of a plurality of range bin periods;
- a first memory having storage capacity for each range bin of a radar sweep and having an input and an output terminal with said input terminal coupled to the output terminal of said subtractor;
- an adder having first and second input terminals and an output terminal with said first input terminal coupled to the output terminal of said first memory;
- a second memory having storage capacity for each range bin of a radar sweep and having an input terminal and and output terminal with said input terminal coupled to the output terminal of said adder;
- a first multiplier having input and output terminals with said input terminal coupled to the output terminal of said second memory and said output terminal coupled to the second input terminal of said subtractor;
- a second multiplier having an input and an output terminal with said input temrminal coupled to the output terminal of said second memory and said output terminal coupled to the second input terminal of said adder; and
- a source of timing pulses coupled to said first and second memories for shifting a range bin of data from said input terminal to said output terminal in each of said memories during each radar sweep.

11. The combination of claim 10 in which said first and second multipliers multiply the data from the output of said second memory by values respectively less than and greater than 1.

12. The combination of claim 12 further including output means coupled to the output terminal of said second memory for detecting the peak amplitude of the return energy from a target, representative of the target position in the scanning dimension.

* * * * *